United States Patent Office 2,816,917
Patented Dec. 17, 1957

2,816,917

SELECTIVE PROCESS FOR DIMERIZATION OF UNSATURATED HYDROCARBONS

Virgil L. Hansley and Stuart Schott, Cincinnati, Ohio, assignors to National Distillers and Chemical Corporation, a corporation of Virginia No Drawing. Application December 14, 1953, Serial No. 398,218

22 Claims. (Cl. 260—533)

This invention relates generally to an improved process for preparing metallo derivatives using alkali metals, and more particularly, to improvements in the process wherein hydrocarbons undergo reaction at increased reaction rates and at high selectivities and yields. Specifically, the process relates to improvements in the process wherein aliphatic conjugated diolefins and vinyl aromatic compounds undergo dimerization in the presence of sodium metal.

It is known to carry out various types of reactions in which organo-sodium compounds are prepared. These compounds can be readily made by reaction of metallic sodium with suitable organic intermediates. For instance, certain hydrocarbons, such as conjugated diolefins and vinyl aromatic compounds, can be selectively dimerized by reaction in the presence of metallic sodium.

One particularly valuable type of sodium derivative which can readily be made from olefins, preferably those of the conjugated diolefin class, is obtained by reacting them under selective conditions with metallic sodium. Under suitable conditions, the sodium addition products first formed dimerize by coupling to provide a practical synthesis for desirable aliphatic hydrocarbon structures. Thus, the reaction of diolefins, such as butadiene, dimethyl butadiene, isoprene, and the methyl pentadienes with elemental sodium gives dimerized sodium derivatives which can be further readily converted into useful products, for example, by carbonation to yield carboxylic acids. Vinyl aromatic compounds, such as styrene and alkyl substituted styrenes, can also be dimerized to give similar type products.

In the past, sodium in the massive form has been used for carrying out these metallation reactions. Studies of the products obtained, for instance, by the reaction of butadiene with sodium in massive form have indicated that they are complex mixtures whose components show a wide range of molecular weights. Quantities of the high molecular weight Buna rubber type polymers are also obtained. These non-selective products are undesirable and have relatively little value.

It has also previously been discovered that if a finely dispersed alkali metal, such as sodium dispersed in a liquid medium, is used, the metallation reaction proceeds selectively to yield the more desirable products in high yields. For example, an aliphatic conjugated diolefin, such as butadiene, is initially treated with finely dispersed sodium in a liquid ether medium to produce a $C_8$ disodiodiene product. This product can then be carbonated to give the salts of the $C_{10}$ dicarboxylic acids in high yields and selectivity. Other diolefins as well as vinyl aromatic compounds behave similarly.

One object of this invention is to provide a practical commercial method for producing dimerized derivatives from olefinic compounds and sodium. These disodium derivatives can be further reacted to yield highly valuable, related products.

Another object of the invention is to effectively increase the available sodium in order to permit the desired reaction to take place at a much higher reaction rate and with greatly increased yields especially based on the amount of sodium charged to the reactor.

A further, more specific object of this invention is to provide a practical method for making disodiooctadienes at a high reaction rate by selective dimerization of butadiene to the exclusion of more highly polymerized products from butadiene.

It is still a further object to react the disodiooctadienes with other reagents, and in particular, to react them with carbon dioxide to produce $C_{10}$ dicarboxylic acids and their sodium salts.

Other objects will become apparent from the complete description of the invention which follows.

It has been found that in carrying out the reaction of the hydrocarbons with metallic sodium or potassium, a remarkable and unexpected increase in reaction rate and, in effect an overall increase in the speed of the reaction, can be achieved by the use of at least one of a class of solid friable attrition agents. The use of these agents has been found to give increase utilization of the sodium. That is, the use of appropriate sized attrition agent and, preferably, one which is capable of undergoing pulverization under the conditions of the reaction, effects a substantial rise in yield of dimerization products based on the sodium utilized and at the same time maintains the same high selectivity of dimerization and high yields based on the diolefin.

In addition, the amount of dimerization to form the disodium derivatives which occurs in a unit of time is effectively increased. That is, the desired reaction takes place at a much higher reaction rate as a result of this improvement.

Other advantages are also obtained among which is a decided tendency toward uniform operation of process in which many of the disadvantages inherent in heterogeneous systems are effectively overcome.

The essence of the invention can be utilized in a number of ways, and it is not intended to limit it to any particular technique. For instance, an attrition agent such as a relatively coarse salt, or oxide or other suitable material can be added to a pebble mill or ball mill or other type attrition reactor in contact with the solid dispersed metallic sodium and the reaction medium whereing the salt is simultaneously ground down to an effective particle size. Or, the attrition agent may be preground before introduction into the mill and/or before introducing sodium and other reactants. The former method is to be preferred in large scale industrial operations since the reaction of the sodium with the conjugated diolefin or vinyl aromatic compound can be initiated substantially simultaneously with the start of the grinding action.

Amounts of the attrition agents in the range of 2.5 to 8 parts to one part of solid sodium have been found to be satisfactory, although smaller and larger amounts are effective but to smaller degrees, in the first place because of the limited attrition action, and in the second place because too much reactor volume is taken up by the attrition agent itself.

The attrition agent should be of an easily friable nature and should permit being ground readily to a particle size at least $1/10$ the size of the sodium dispersion particles which are being used. For instance, for a solid metallic sodium dispersion of average particle size of 50 microns, the size of the particles of solid attrition agent should rapidly reach 5 microns or less under the attrition conditions. Although it is not intended to limit the invention to any theory, it is believed that sodium dispersion particles are stabilized against agglomeration by adsorbing a film of smaller attrition particles which prevent the approach and coalescence of clean sodium surfaces. Thus, it is possible to reduce particle size of relatively soft metals by grinding without the usual coalescence. Without the presence of the attrition agent herein described, ball mill operations using metallic sodium dispersions result in the rapid formation of massive chunks of reagglomerated sodium metal.

Materials suitable for use as the solid attrition agent include inorganic solids such as alkali metal salts from the classes of the halides and sulfates, for example sodium chloride, potassium chloride, sodium sulfate, potassium sulfate, and the like. Also useful is the class of compounds which consists of metallic and non-metallic oxides which are not reactive with metallic sodium under the conditions of the reactions. Thus sand (silicon dioxide), diatomaceous earth (Celite), rutile, iron oxide, magnesia and alumina operate satisfactorily. Other materials, inert to the reaction, such as graphite, zircon and powdered coal, are also operable.

It is not known in what manner the solid attrition agents function to produce such marked improvements particularly in reaction rates. Possibly, the action may be that of increasing the surface area of the metallic sodium by means of a very effective grinding action made possible by use of the friable attrition agent. The achievement and maintenance of an extremely fine particle size with sodium is surprising and remarkable since sodium is a soft, ductile material which tends either to smear itself onto a grinding surface or to reagglomerate because of its relatively low softening point. Regardless of the exact manner by which the invention operates, it provides a method for realizing increased beneficial effects of dispersed solid sodium in a liquid phase reaction in a medium in which sodium is insoluble.

The diolefins which can be used for this improved process include any aliphatic conjugated diolefins, for example, butadiene, isoprene, dimethyl butadiene, the pentadienes, as the methyl-1,3-pentadienes, and the like. In general, it is desirable to use the aliphatic conjugated diolefins having from 4 to 8, inclusive, carbon atoms. The method is particularly well adapted to the use of butadiene as the diolefin. Also vinyl aromatic compounds such as styrene, and ortho and paramethyl sytrenes can be employed.

It is necessary that the alkali metal to be used should be initially in a finely divided form. In general, this requires that sodium be in a finely dispersed state in a liquid reaction medium. Although either sodium or potassium may be used as the alkali metal reactant, the use of sodium is preferred over potassium since sodium gives excellent selectivities and yields of dimerized products, and it is cheaper and more readily available. Mixtures of sodium and potassium, and of sodium and calcium can also be used.

A sodium dispersion in which the average particle size is less than 50 microns is quite satisfactory for carrying out the process, the preferred size range being 1 to 10 microns. This dispersion is most conveniently made in an inert hydrocarbon as a separate step preliminary to the reaction with the diene or vinyl aromatic compound.

The reaction medium found most suitable for use consists essentially of an ether and only certain types of ethers are effective. These particular classes of ethers appear to have the common property of serving as promoters of the selective dimerization reaction involved. The ether can be any aliphatic mono ether having a methoxy group, in which the ratio of the number of oxygen atoms to the number of carbon atoms is not less than 1:4. Examples include dimethyl ether, methyl ethyl ether, methyl n-propyl ether, methyl isopropyl ether, and mixtures of these methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, and methyl butyl ethers. The simple methyl monoethers, as dimethyl ether, and the dimethyl and diethyl ethers of ethylene glycol are preferred. Diethyl ether and hydrocarbon type solvents such as isooctane, kerosene, toluene, and benzene cannot be used exclusively as reaction media since they adversely affect the reaction.

The ethers should not contain any groups such as hydroxyl, carboxyl and the like which are distinctly reactive towards sodium. Although the ether may react in some reversible manner, it must not be subject to extensive cleavage. Since such cleavage action destroys the ether, uses up sodium and introduces into the reacting system sodium alkoxides which, in turn, tend to induce the rubber forming reaction with the diene as pointed out above rather than the desired dimerization reaction.

Although the reaction medium should consist essentially of the specified ethers, other inert media can be present in limited amounts. In general, these inert media will be introduced with the sodium dispersion as the liquid in which the sodium is suspended and will act chiefly as diluents. The concentration of ether in the reaction mixture should at all times be maintained at a sufficient level to have a substantial promoting effect upon the desired dimerization reaction.

It is usually desirable to include in the dimerization reaction mixture at least one supplementary activating material. This material is a relatively small amount of at least one material from the class of polycyclic aromatic compounds. By this term it is intended to include both condensed ring hydrocarbons such as naphthalene and phenanthrene, as well as the uncondensed polycyclic compounds such as diphenyl, the terphenyls, dinaphthyl, tetraphenyl ethylene and the like. The polyphenyl compounds such as diphenyl and the terphenyls and their mixtures have been found to be particularly useful. The amount of the hydrocarbon to be used will vary over a range which in every case will be relatively small in comparison with the amount of diolefin or vinyl aromatic compound undergoing reaction. Concentrations in the range of 1 to 10 wt. percent based on the amount of diolefin or vinyl aromatic compound are ordinarily quite sufficient.

It is a further requirement in the process that the reaction temperature preferably be held below 0° C. The temperature range between −20° to −50° C. is the preferred one. Generally speaking, all ethers begin to yield cleavage products at temperatures of about 0° C. and above with the result that sufficient alkoxides are formed to yield high polymeric acids rather than the desired low molecular weight dimers.

In one typical method for carrying out the improvements of this invention, the sodium or potassium dispersion is initially prepared by placing an inert hydrocarbon such as isooctaine in a suitable vessel with the appropriate amount of sodium. The mixture is heated in a surrounding bath or otherwise until the sodium has melted (M. P. 97.5° C.). Then a suitable high speed agitator is started and, preferably, an emulsifier consisting, for example, of ½% (based on sodium) of the dimer of linoleic acid is added. After a short period of agitation, a test sample of the dispersion shows the particle size to be in the 5–15 micron range.

The stirring is stopped and the dispersion is allowed to cool to room temperature. This dispersion is now ready to be used in the selective dimerization. Inert liquids such as saturated dibutyl ether, normal octane, n-heptane, or straight run kerosenes, may be employed as suspension media for the dispersion. Any such dispersion having sufficiently finely divided sodium or potassium will suffice. Other well-known substances may be used instead of the dimeric linoleic acid as the dispersing agents.

The dispersion is added to the ether which is pre-cooled to and maintained between −20° to −50° C. It is only necessary to employ an amount of dispersed sodium stoichiometrically equal to the appropriate reactant to be dimerized. The solid attrition agent is then added. The diolefin or vinyl aromatic compound should be introduced slowly. One quite satisfactory method is to introduce this reactant into the reaction vessel at approximately the same rate as that at which it reacts with the sodium. For maximum reaction rate of the dimerization, it is desirable to maintain constant agitation with the reaction mixture. The most effective agitation is to be had by conducting the reaction in a pebble or similar mill suitable for wet grinding.

The dimetallic derivatives of the diolefin dimers are rapidly and selectively formed under these conditions. These products, depending on the diolefins, may be either soluble or insoluble in the reaction medium. In general, they tend to form slurries, as for example, the disodiooctadiene product from sodium and butadiene.

The use of the attrition agents introduces no unusual or difficult separation problems. If the final product is water soluble such as an alkali metal salt, it can be dissolved away by water from the more insoluble organic products particularly the higher molecular weight free acids. If the attrition material is water insoluble as an oxide, then the separation can be made by other simple mechanical or physical means. One convenient way is to separate the acidic products as their soluble salts.

These dimetallic derivatives can either be isolated as such, or since they tend to be unstable and difficult to handle, they can be directly and immediately thereafter subjected to further reactions to form valuable derivatives. For example, subsequent carbonation of the mixture containing the products yields the salts of dicarboxylic acids. The carbonation may be done by subjecting the dimetallic-diene derivative to dry gaseous carbon dioxide, by contact with solid carbon dioxide or by means of a solution of carbon dioxide. The temperature should be controlled below 0° C. to avoid the formation of unwanted by-products. This carbonation forms the dimetallic salts of the unsaturated aliphatic dicarboxylic acids. These salts will contain two more carbon atoms than the dimetallic diene dimers from which they are produced. In the case where butadiene is the starting aliphatic diolefin, there results by this method the selective production of $C_{10}$ unsaturated dicarboxylic acids.

These unsaturated diacid products find use as chemical intermediates, and are valuable in the preparation of polymers and copolymers, plasticizers, and drying oils. They, as well as other derivatives, are useful in esters, polyester and polyamide resins and, generally, as chemical intermediates.

In addition, the unsaturated diacids or their salts or other derivatives can be hydrogenated at the double bonds to yield the corresponding saturated compounds, particularly the saturated diacids. This also affords a convenient and accurate way to identify structures of the intermediate products. For example, the disodiooctadiene product obtained from butadiene ultimately yields a practically quantitative mixture of sebacic acid, 2-ethyl-suberic, and 2,2'-diethyl adipic acid.

The invention will be described in greater detail by the following examples. These examples and embodiments are illustrative only and the invention is not in any way intended to be limited thereto except as indicated by the appended claims. All parts are expressed as by weight unless otherwise specified.

EXAMPLE 1

*Use of sodium chloride in butadiene dimerization*

The experiment was carried out using a steel ball mill as a reaction vessel. This ball mill was positioned to rotate on a nearly horizontal axis. About ⅓ of its volume was occupied by equal numbers of steel balls having varying diameters of ¼", ⅜" and ½". The reactor mill was charged with 600 parts of sodium chloride and partially immersed in a solid carbon dioxide-methanol cooling bath sufficient to hold the temperature within the range of −20 to −30° C. A reflux condenser was attached to the mouth of the mill. A nitrogen blanket was provided throughout the reaction period. Into this rotating autoclave reactor there was placed about 1280 parts of dimethyl ether to which was added 6 parts of paraterphenyl. The mill was rotated at a speed of 60–80 R. P. M. About 138 parts of sodium in the form of a 50% dispersion in refined kerosene was then added. Approximately 356 parts of butadiene was then introduced in the reactor at a uniform rate over a period of 254 minutes. During this reaction period, the temperature of the reaction mixture was controlled at −25 to −30° C.

The reaction proceeded rapidly and appeared to be complete almost as soon as the butadiene addition was completed. This resulted in the formation of a slurry consisting of solid sodium chloride and a mixture of the disodiooctadienes.

This reaction was then subjected to carbonation by pouring it upon an excess of crushed solid carbon dioxide. This procedure yielded a white slurry consisting substantially of mixed sodium salts of $C_{10}$ dicarboxylic acids. The excess carbon dioxide and dimethyl ether were allowed to evaporate, leaving behind an essentially dry sodium chloride-sodium carboxylate mixture.

This substantially dry mixture was dissolved in an excess of hot water and the free organic acids were precipitated by the addition of concentrated hydrochloric acid. These free organic acids consisting essentially of $C_{10}$ aliphatic dicarboxylic acids are substantially insoluble in aqueous solution and consequently formed an upper organic layer which was separated. Ether extraction of the aqueous solution yielded an additional, small amount of the organic diacids. A yield of crude, distilled diacids of 553 parts having an average neutral equivalent of 106 was obtained.

This free unsaturated acid product was then converted to the corresponding methyl esters, which were then hydrogenated over a nickel catalyst. The resulting saturated product was fractionally distilled under vacuum. By this distillation, three pure ester fractions were obtained. These ester fractions were saponified and the free diacid products were recovered as follows:

Sebacic acid melting at 134.5° C. was recovered in 35% yield. The neutral equivalent was 101.0.

2-ethyl suberic acid was isolated in 47% yield with a melting point of 73.7° C. It showed a neutral equivalent of 101.0.

The above two acids were positively identified by the mixed melting point technique using authentic samples of each.

2,2'-diethyl adipic acid was obtained in 10% yield. This acid has two asymmetric carbon atoms and, therefore, exists in meso and racemic forms. These are reported in the literature to melt at 57° C. and 137° C. respectively. The product obtained in this process yielded two forms melting at 55–57° C. and 135–138° C. respectively.

EXAMPLE 2

*Use of sodium chloride in isoprene dimerization*

Substantially the same procedure as that described in Example 1 was repeated using 205 parts of isoprene as the conjugated diolefin instead of butadiene and 300 parts of sodium chloride. The reaction yielded a mixture of $C_{12}$ dicarboxylic acids in over 60% yield, based on the sodium.

EXAMPLE 3

*Use of sodium chloride in dimerization of methylpentadienes*

A further experiment was carried out following the procedure of Example 1 except that 246 parts of a mixture of 4-methyl-1,3-pentadiene and 2-methyl-1,3-pentadiene was used as the conjugated diolefin. The resulting reaction mixture yielded a mixture of $C_{14}$ dicarboxylic acids in over 50% yield, based of the sodium.

EXAMPLE 4

Use of sodium chloride in styrene dimerization

To a mixture of about 7 parts of sodium (as a 50% dispersion in isooctane), 10 parts of dry sodium chloride, 1 part of o-terphenyl and about 350 parts of dry dimethyl ether contained in a ball mill, was added 26 parts of styrene over a two and one-half hour period. At the end of this time the reaction mixture was carbonated by pouring it on powdered Dry Ice. From the reaction mixture there was obtained, after purification, a 51% yield of pure $\alpha,\alpha'$-diphenyladipic acid.

EXAMPLE 5

Use of sodium sulfate in butadiene dimerization

The same procedure of Example 1 was repeated using butadiene as the diolefin but using 600 parts of sodium sulfate instead of sodium chloride. A yield of 88% of the $C_{10}$ dicarboxylic acids was obtained.

EXAMPLE 6

Use of sand in butadiene dimerization

The procedure described in Example 1 was again repeated employing butadiene as the diolefin and using coarse silica sand (average particle size about 200 microns). An 83% yield of $C_{10}$ dicarboxylic acids was recovered.

EXAMPLE 7

Use of zircon in butadiene dimerization

The reaction was carried out as described in the preceding examples. The ball mill with about 1/3 its space occupied by flint pebbles was charged with about 1260 parts of anhydrous dimethyl ether and 300 parts of 325 mesh zircon. About 138 parts of 50% sodium dispersion in mineral spirits was added in three incremental portions while 324 parts of 1,3-butadiene was passed into the reactor. Carbonation on an excess of crushed solid carbon dioxide, followed by acidification, resulted in an 86.5% yield of mixed, unsaturated $C_{10}$ acids.

EXAMPLE 8

Use of graphite in butadiene dimerization

The reaction was carried out as described in the preceding examples. The ball mill was charged with flint pebbles as before. About 1260 parts of anhydrous dimethyl ether and 300 parts of powdered graphite were added. About 138 parts of 50% sodium dispersion in mineral spirits was added in three incremental portions while 324 parts of 1,3-butadiene was passed into the reactor. Carbonation on crushed, solid carbon dioxide, followed by acidification, resulted in an 83.6% yield of mixed, unsaturated $C_{10}$ acids.

EXAMPLE 9

Use of magnesium oxide in butadiene dimerization

The reaction was carried out as described in the preceding examples. The ball mill was charged with flint pebbles, about 1260 parts of anhydrous dimethyl ether, and 300 parts of anhydrous magnesium oxide. About 138 parts of 50% sodium dispersion in mineral spirits was added in three incremental portions while 324 parts of 1,3-butadiene was passed into the reactor. Carbonation on crushed, solid carbon dioxide, followed by acidification, resulted in high yield of mixed, unsaturated $C_{10}$ acids.

EXAMPLE 10

Use of potassium chloride in butadiene dimerization

The reaction was carried out as described in the preceding examples. The ball mill was charged with flint pebbles, about 1260 parts of anhydrous dimethyl ether, and 300 parts of anhydrous potassium chloride. About 138 parts of 50% sodium dispersion in mineral spirits was added in three incremental portions while 324 parts of 1,3-butadiene was passed into the reactor. Carbonation on crushed, solid carbon dioxide, followed by acidification, resulted in an 80.4% yield of mixed, unsaturated $C_{10}$ acids.

EXAMPLE 11

Comparative studies on use of attrition agents in ball mill reactor

A series of comparative experiments was done in order to study variables in the process. Butadiene was the diolefin employed in all these runs. The details of the operation and the results obtained are shown in Table I below.

In runs No. 1 to 6, inclusive, a ball mill reactor such as that described in the preceding examples was employed. In all six experiments, there was present dimethyl ether as the reaction medium. A reaction temperature of approximately $-20°$ to $-30°$ C. was maintained. In all the runs, a separate carbonation step using excess solid $CO_2$ was carried out subsequent to the contacting of the sodium and butadiene in the dimerization reaction.

Run 1 shows the results obtained when the process was carried out in a ball mill and in the presence of a polycyclic aromatic hydrocarbon, para-terphenyl. No attrition agent was present. The products were found to contain about 71% of $C_{10}$ diacids based on the butadiene. Run 2 shows the increased yield and improved neutral equivalent value (as compared to the values for the product of run 1) which were obtained when sodium chloride was added as an attrition agent. Even better yield values were obtained when a suitable polycyclic aromatic hydrocarbon was employed in conjunction with the attrition agent. The total yields in these cases, runs 3 to 6, inclusive, ranged from 84 to 91% based on the butadiene. The reaction was very selective in the dimerization which took place.

TABLE I

| Run No. | Reaction conditions | | | | | Product analysis | |
|---|---|---|---|---|---|---|---|
| | Sodium, percent excess over theory | Aromatic hydrocarbon | Attrition agent | Butadiene (grams) | Time, min. | Distillable $C^{10}$ acids (grams) | Percent yield on Na and butadiene |
| 1 | None | p-Terphenyl | None | 322 | 81 | 420 | 71.1 |
| 2 | None | None | Coarse NaCl | 343 | 171 | 504 | 83.4 |
| 3 | None | p-Terphenyl | do | 346 | 173 | 510 | 86.8 |
| 4 | None | do | do | 325 | 82 | 512 | 84.2 |
| 5 | None | Mixed terphenyls | Coarse sand | 328 | 82 | 530 | 88.3 |
| 6 | None | p-Terphenyl | Coarse $Na_2SO_4$ | 326 | 82 | 523 | 90.6 |

What is claimed is:

1. A process which comprises selectively reacting an olefin of the group consisting of aliphatic conjugated diolefins and vinyl aromatic hydrocarbons with a finely divided alkali metal of the group consisting of sodium and potassium in an ether reaction medium of the group consisting of aliphatic monoethers having a methoxy group and an oxygen to carbon ratio of not less than 1:4 and polyethers derived from an aliphatic polyhydric alcohol having all the hydroxyl hydrogen atoms replaced by alkyl groups and mixtures thereof in the presence of a solid, friable attrition agent at a temperature below about 0° C., thereby selectively forming the corresponding dialkali metal derivatives of a dimer of said olefin.

2. A process, as defined in claim 1, wherein the alkali metal is sodium, the ether is dimethyl ether, the olefin is butadiene, and the reaction is carried out while maintaining the reaction mixture under agitation.

3. A process, as defined in claim 1, wherein the olefin is an aliphatic conjugated diolefin of from four to eight carbon atoms and the alkali metal is sodium.

4. A process, as defined in claim 1, wherein the reaction is carried out while maintaining the reaction mixture under agitation.

5. A process, as defined in claim 1, in which the reaction is carried out in presence of a small amount, based on the weight of the olefin, of a polycyclic aromatic hydrocarbon.

6. A process, as defined in claim 1, wherein the attrition agent is an alkali metal salt.

7. A process, as defined in claim 1, wherein the attrition agent is an inorganic oxide.

8. A process, as defined in claim 1, wherein the attrition agent is selected from the group consisting of sodium chloride, sodium sulfate, sand, graphite, and potassium chloride.

9. A process, as defined in claim 1, wherein the olefin is butadiene.

10. A process, as defined in claim 1, wherein the olefin is isoprene.

11. A process, as defined in claim 1, wherein the olefin is methyl pentadiene.

12. A process for selective preparation of dialkali metal salts of dicarboxylic acids which comprises an initial step of selectively reacting an olefin of the group consisting of aliphatic conjugated diolefins and vinyl aromatic hydrocarbons with a finely divided alkali metal of the group consisting of sodium and potassium in an ether reaction medium of the group consisting of aliphatic monoethers having a methoxy group and an oxygen to carbon ratio of not less than 1:4 and polyethers derived from an aliphatic polyhydric alcohol having all the hydroxyl hydrogen atoms replaced by alkyl groups and mixtures thereof in the presence of a solid, friable attrition agent at a temperature below about 0° C. thereby providing a reaction mixture comprising selectively formed corresponding dialkali metal derivatives of a dimer of said olefin, and in a subsequent step carbonating dialkali metal derivatives of said dimer and unseparated from said reaction mixture to convert said derivatives to the corresponding dialkali metal salts of dicarboxylic acids having two more carbon atoms per molecule than said dimer.

13. A process, as defined in claim 12, wherein the olefin is an aliphatic conjugated diolefin of from four to eight carbon atoms, the alkali metal is sodium, and the carbonation step is carried out at below about 0° C.

14. A process, as defined in claim 12, wherein the initial step is carried out in presence of a small amount, based on the weight of the olefin, of a polycyclic aromatic hydrocarbon.

15. A process, as defined in claim 12, wherein the initial step is carried out while maintaining the reaction mixture under agitation.

16. A process, as defined in claim 12, wherein the olefin is butadiene, the ether is dimethyl ether, the alkali metal is sodium, and the initial step is carried out while maintaining the reacting mixture under agitation.

17. A process, as defined in claim 12, wherein the attrition agent is an alkali metal salt.

18. A process, as defined in claim 12, wherein the attrition agent is an inorganic oxide.

19. A process, as defined in claim 12, wherein the attrition agent is selected from the group consisting of sodium chloride, sodium sulfate, sand, graphite and potassium chloride.

20. A process, as defined in claim 12, wherein the olefin is butadiene.

21. A process, as defined in claim 12, wherein the olefin is isoprene.

22. A process, as defined in claim 12, wherein the olefin is methyl pentadiene.

References Cited in the file of this patent

UNITED STATES PATENTS

| | | |
|---|---|---|
| 2,171,867 | Scott et al. | Sept. 5, 1939 |
| 2,352,461 | Walker | June 27, 1944 |
| 2,402,167 | Lang et al. | June 18, 1946 |
| 2,773,092 | Carley et al. | Dec. 4, 1956 |

OTHER REFERENCES

Conant et al.: J. A. C. S. vol. 50, pgs. 551–8 (1928).

Hansley: Ind. and Eng. Chem. vol 43, pgs. 1759–66 (1951).